US011006148B2

(12) United States Patent
Yuan et al.

(10) Patent No.: US 11,006,148 B2
(45) Date of Patent: May 11, 2021

(54) METHOD AND SYSTEM FOR ADDING IMAGE CONTENT THAT CONTAINS ONE OR MORE GRAPHICAL OBJECTS TO AN IMAGE FRAME USING AN ENCODER

(71) Applicant: Axis AB, Lund (SE)

(72) Inventors: Song Yuan, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 13 days.

(21) Appl. No.: 16/672,546

(22) Filed: Nov. 4, 2019

(65) Prior Publication Data
US 2020/0204828 A1 Jun. 25, 2020

(30) Foreign Application Priority Data

Dec. 21, 2018 (EP) .................................... 18215276

(51) Int. Cl.
*G06K 9/00* (2006.01)
*H04N 19/625* (2014.01)
(Continued)

(52) U.S. Cl.
CPC ........... *H04N 19/625* (2014.11); *H04N 19/12* (2014.11); *H04N 19/48* (2014.11)

(58) Field of Classification Search
CPC ...... H04N 19/625; H04N 19/12; H04N 19/48; H04N 19/122; H04N 19/136; H04N 19/17;
(Continued)

(56) References Cited

U.S. PATENT DOCUMENTS 5,761,601 A 6/1998 Nemirofsky et al.
5,850,540 A 12/1998 Furuhashi et al.
(Continued)

FOREIGN PATENT DOCUMENTS

CN 105812823 A 7/2016
EP 0656729 A2 7/1995
(Continued)

OTHER PUBLICATIONS

Lee, Y. Y. and Woods, J. W., "Video Post-Production with Compressed Images," SMPTE—Motion Imaging Journal, vol. 103, No. 2, SMPTE, Feb. 1, 1994, pp. 76-84 (See English Abstract).
(Continued)

*Primary Examiner* — Jose L Couso
(74) *Attorney, Agent, or Firm* — Xsensus LLP

(57) ABSTRACT

The present invention relates to a method for adding a graphical object to image data of one or more image frames comprising a first image frame, the graphical object being added during encoding of the one or more image frames using an encoder, wherein the image data generator is converting the graphical object into a first set of discrete frequency transform, DFT, blocks each DFT block being associated with a position in the one or more image frames to which the DFT block corresponds. The encoder is performing DFT on a plurality of block of pixels of the first image frame, to output a second set of DFT blocks and then replacing a subset of DFT blocks of the second set of DFT blocks with the first set of DFT blocks according to the positions associated with the first set of DFT blocks.

14 Claims, 4 Drawing Sheets

(51) Int. Cl.
*H04N 19/12* (2014.01)
*H04N 19/48* (2014.01)

(58) Field of Classification Search
CPC ...... H04N 19/46; H04N 19/13; H04N 19/176; H04N 19/184; H04N 19/107; H04N 19/20; H04N 19/132; H04N 19/137; H04N 19/172; H04N 19/467; H04N 21/8146; H04N 21/23412; H04N 21/23424; H04N 21/23892; H04N 21/2541; H04N 21/8358; H04N 1/32144; H04N 1/3216; H04N 1/32208; H04N 1/32352; H04N 2005/91335; H04N 2201/3225; H04N 2201/3226; H04N 2201/3233; H04N 2201/3246; H04N 2201/3249; H04N 2201/327; H04N 5/913; H04N 7/1675; G06K 19/06037; G06K 19/06103; G06K 7/1417; G06K 7/1447; G06T 11/001; G06T 9/00; G06T 9/007; G06T 1/0007; G06T 1/0021; G06T 1/0028; G06T 2207/10016; G06T 2201/0061; G06T 2201/0053; G06T 5/004; G06T 3/4092; G06F 21/00; G06F 21/105; G06F 21/16; G06F 21/36; G06F 2221/0737; G06F 16/955; G07D 7/0034; G07D 7/004; G09G 2340/02; G11B 20/00086; G11B 20/00884; G11B 27/031; H04L 2209/603; H04L 9/3226; H04W 12/06

See application file for complete search history.

(56) References Cited

U.S. PATENT DOCUMENTS

| | | | |
|---|---|---|---|
| 6,208,745 | B1 | 3/2001 | Florencio et al. |
| 7,782,952 | B2 | 8/2010 | Huang et al. |
| 8,532,468 | B2 | 9/2013 | Togo et al. |
| 10,347,293 | B1* | 7/2019 | Skinner ............... G06F 40/30 |
| 2004/0190611 | A1 | 9/2004 | Nakajima |
| 2015/0324946 | A1 | 11/2015 | Arce et al. |
| 2017/0228525 | A1 | 8/2017 | Wajs et al. |
| 2019/0043201 | A1* | 2/2019 | Strong ............... G06K 9/00624 |
| 2019/0379893 | A1* | 12/2019 | Krishnan ............ H04N 19/132 |

FOREIGN PATENT DOCUMENTS

| | | |
|---|---|---|
| EP | 0805600 A2 | 11/1997 |
| EP | 0984633 A2 | 3/2000 |
| WO | 95/33342 A1 | 7/1995 |

OTHER PUBLICATIONS

Swati, S., et al., "A Watermarking Scheme for High Efficiency Video Coding (HEVC)," PLOS ONE, vol. 9, No. 8, Aug. 21, 2014, pp. 1-8.

Chang, SF., et al., "Manipulation and Compositing of Mc-Dct Compressed Video," IEEE journal on selected areas in communications, vol. 13, No. 1, IEEE Inc., New York, US, Jan. 1, 1995, pp. 1-11.

Office Action dated Sep. 22, 2020 in European Patent Application No. 18 215 276.9, 7 pages.

* cited by examiner

METHOD AND SYSTEM FOR ADDING IMAGE CONTENT THAT CONTAINS ONE OR MORE GRAPHICAL OBJECTS TO AN IMAGE FRAME USING AN ENCODER

CROSS-REFERENCE TO RELATED APPLICATION

The present application claims priority to EP 18215276.9, filed Dec. 21, 2018, the entire contents of which are incorporated herein by reference.

TECHNICAL FIELD

The present invention relates to video encoding and specifically ways to add image content to an encoded video stream.

BACKGROUND

It is today common to add graphical features in a video stream. These may be added to for example help the viewer discern between various objects in the stream or simply to append information. Graphical features may include bounding boxes, privacy masks, border lines as well as matrix barcodes such as quick response (QR) codes.

However, when adding the additional graphical features directly, as pixels, to the image frames of the video stream, this may often result in distortion of the graphical features when the image frames of the video stream is compressed during encoding. This is because many encoding methods rely on transforming the image from the spatial domain to the frequency domain, through mathematical operations like discrete cosine transform (DCT), and smoothing out the high-frequency information. This corresponds to a loss of the discrete colour and intensity transitions, which may distort the added graphical features such as a QR code or bounding box when the image is transformed back into the spatial domain.

One solution to this problem may be found in adding the graphical features as a rendered overlay on top of the source video stream. Creating these overlays however, could cause extra system load due to the added rendering step as well as a higher bit rate requirement. It may in some cases also not be viable to use a single hardware encoder to encode both the video stream and the rendered overlay, adding to required system complexity. Another limitation, which the overlay approach does not address, is the lack of specific handling of the areas of the underlying image frame where the overlay comprises a graphical feature, which may lead to coding inefficiencies as the same regions of the video may be rendered more than once.

In this context, there exists a need for further improvements to this technical field.

SUMMARY OF THE INVENTION

In view of the above, it is thus an object of the present invention to overcome or mitigate at least some of the problems discussed. In particular, it is an object to provide methods, software, and systems for adding a graphical object to an encoded video stream with little or no information loss of the added graphical object when being decoded.

According to a first aspect of the invention there is provided a method for adding a graphical object to image data of one or more image frames comprising a first image frame, the graphical object being added during encoding of the one or more image frames using an encoder, the method comprising the steps of:

receiving, by an image data generator, data pertaining to the graphical object to be added to the image data of the one or more image frames;

converting, by the image data generator, the graphical object into a first set of discrete frequency transform, DFT, blocks, based on a defined size of a coding unit, CU, of the encoder, each DFT block being associated with a position in the one or more image frames to which the DFT block corresponds;

performing, by the encoder, DFT on a plurality of block of pixels of the first image frame, to output a second set of DFT blocks;

instructing, by the image data generator, the encoder to replace a subset of DFT blocks of the second set of DFT blocks with the first set of DFT blocks according to the positions associated with the first set of DFT blocks.

The phrase "graphical object" is generally meant to refer to for example bounding boxes, privacy masks, border lines, logotypes, and matrix barcodes as well as other graphical objects. These may function to highlight or hide something in the frame or simply carry information in some form.

The term "discrete frequency transform" generally refers to several different mathematical transform operations such as discrete cosine transforms, discrete sine transforms and discrete Fourier transforms. The common denominator is that they may be used to transform a spatial colour domain input to a frequency domain representation of the same.

The term "coding unit" generally refers to the image frame sub unit utilised in the encoding process. A macroblock is a common type of coding unit in video encoding and may typically consist of a 16×16 block of pixels in the image.

The present invention concerns adding image content that contains one or more graphical objects to a first image frame or video sequence of image frames through the use of an encoder. The image data generator acts as an input step of the encoding process wherein a graphical object or data necessary to build such graphical object is received. If data is received, the image data generator may use this to build the graphical object. Information about e.g. the extent of the graphical object and its position relative to the first frame may be stored at the image data generator.

The graphical object may be static or dynamic, meaning that it may stay the same over a plurality of image frames, or that it may be updated or modified between frames of a video sequence. The image data generator further transforms the graphical object to a first set of DFT blocks separately from the encoder which produces a second set of DFT blocks based on the first image frame or video sequence. The graphical object may then be appended to the first frame using the information of position and extent previously stored by instructing, by the image data generator, the encoder to replace a subset of DFT blocks of the second set of DFT blocks with the first set of DFT blocks according to the positions associated with the first set of DFT blocks. During encoding, this enables selective compression of the graphical object relative to the compression of the first image frame.

This allows for the use of a higher compression ratio, where it can be safely employed, without sacrificing excessively on image quality, to reduce the bit rate and bandwidth requirements of the image while making sure finer detail, i.e. the added graphical objects, will not lose their carried information as a lower compression ratio may be used for these features. An advantage of this method over using a fully rendered overlay is that the bit rate may be reduced, since there is no extra overlay to handle, store or transmit. Another advantage may be saving on system resources and overall complexity as less hardware may be necessary to perform the same steps. Furthermore, separate encoding of graphical objects may alleviate coding inefficiencies and remove redundant encoding operations so that for example a specific area of the final encoded image frame is not processed more than once.

According to some embodiments, the first image frame is intra encoded by the encoder, wherein the one or more image frames comprises a second frame being a subsequent to the first image frame, the second image frame being inter frame encoded and referencing the first image frame, the method comprising the step of:

instructing, by the image data generator, the encoder to inter encode blocks of pixels in the second image frame corresponding to the positions associated with the first set of DFT blocks, and to set motion vectors of said blocks of pixels in the second image frame to zero.

Consequently, advantageously this embodiment allows for the reuse of data regarding the graphical object across several frames to reduce the amount of redundant work performed by the encoder (i.e. performing block matching for the blocks corresponding to the graphical object) and to further reduce the bit rate.

According to some embodiments, the one or more image frames represent a group of pictures, GOP, wherein the above mentioned method is repeated for all image frames subsequent to the first image frame in the GOP.

Consequently, advantageously this embodiment allows for further reuse of data regarding the graphical object across several frames in the GOP to reduce the amount of redundant work performed by the encoder.

According to some embodiments, the data pertaining to a graphical object comprises a bitmap describing the graphical object.

By "bitmap" it is implied that there is an image or array with values for each pixel in the image or cell in the array. In a simple bitmap these values may be either 0 or 1 and correspond to whether that pixel is transparent or not when overlaid onto another image. A bitmap may also contain more information relating to colour and may in those cases be called a pixmap.

Consequently, using bitmaps to describe a graphical object may represent a low complexity method to produce the DFT blocks in the image generator According to some embodiments, the data pertaining to a graphical object further comprises coordinates defining a position in the the image data of the one or more image frames where the graphical object should be added.

Consequently, the flexibility of the method is increased since e.g. a bitmap defining the graphical object only needs to include the pixel values for the graphical object, while the position on the first image frame is defined using e.g. a X-coordinate and an Y-coordinate.

According to some embodiments, the data pertaining to a graphical object defines a polygon describing the graphical object.

Consequently, the complexity penalty from adding a graphical object is reduced as only a few coordinates and/or defining vectors would be needed to describe the object boundaries. Polygons may be utilised favourably in cases where predictable versions of standard graphical objects are to be used, such as bounding boxes, privacy masks and border lines.

According to some embodiments, the data pertaining to a graphical object further comprises data defining a colour of the graphical object.

Consequently, a graphical object may have its colours defined to e.g. ensure contrast is achieved against the first image frame.

According to some embodiments, a method further comprising, after the step of instructing, by the image data generator, the encoder to replace a subset of DFT blocks of the second set of DFT blocks with the first set of DFT blocks according to the positions associated with the first set of DFT blocks, the step of:

performing, by the encoder, quantization of the second set of DFT blocks to form a set of quantized DFT blocks, wherein the quantization is performed using a map of quantization parameters which defines a quantization parameter for each DFT block of the second set of DFT blocks, performing, by the encoder, entropy encoding of the set of quantized DFT blocks to form a bit stream.

The term "entropy encoding" is generally meant to refer to lossless encoding schemes such as Huffman coding, context-adaptive variable length coding (CAVLC) and context-adaptive binary arithmetic coding (CABAC).

By "quantization" it is generally meant to refer to the compression technique where a range of values is reduced to a single value.

Consequently, a bit stream of the one or more image frames including the added graphical objects are formed and may be transmitted to a decoder for decoding.

According to some embodiments, the step of converting, by the image data generator, the graphical object into a first set of DFT blocks comprises:

a) converting the graphical object into a temporary first set of discrete frequency transform, DFT, blocks, using a trial frequency transform, b) converting the temporary first set of DFT blocks back to a representation of the graphical object using an inverse of the trial frequency transform, c) computing a difference value between the representation of the graphical object and the received graphical object, upon determining that the difference value exceeds a threshold error value, iteratively performing steps a)-c) using a different trial frequency transform until the difference value does not exceed the threshold error value, and using the trial frequency transform resulting in the difference value which does not exceed the threshold error value for converting the graphical object into the first set of discrete frequency transform, DFT, blocks.

The term "difference value" may refer to for example a mean square error, mean absolute error or a binary error between the pixel information of the graphical object input and the representation which is on trial. Binary error is established, in the QR code case by comparing the pixel colour value in the representation graphical object with that of the received graphical object and assuming it is either black or white.

Consequently, the process of creating the first set of DFT blocks in the image generator is operating with feedback to make sure the encoded result is of satisfactory quality relative to the original source graphical object.

According to some embodiments, the step of converting, by the image data generator, the graphical object into a first set of DFT blocks comprises:

a) converting the graphical object into a temporary first set of DFT blocks, using a trial frequency transform;

b) performing quantization of the temporary first set of DFT blocks to form using a trial quantization parameter to form a temporary set of quantized DFT blocks;

c) performing inverse quantization of the temporary set of quantized DFT blocks to form a temporary second set of DFT blocks;

d) converting the temporary second set of DFT blocks back to a representation of the graphical object using an inverse of the trial frequency transform, e) computing a difference value between the representation of the graphical object and the received graphical object, upon determining that the difference value exceeds a threshold error value, iteratively performing steps a)-e) using a different trial frequency transform or a different trial quantization parameter until the difference value does not exceed the threshold error value, and using the trial frequency transform resulting in the difference value which does not exceed the threshold error value for converting the graphical object into the first set of discrete frequency transform, DFT, blocks, wherein the step of performing, by the encoder, quantization of the second set of DFT blocks to form a set of quantized DFT blocks comprises using the trial quantization parameter resulting in the difference value which does not exceed the threshold error value as the quantization parameter for the DFT blocks of the second set of DFT blocks corresponding to the graphical object.

Consequently, a quantization parameter (QP) and quantization step is introduced which may be used to improve the DFT conversion feedback process further.

According to some embodiments, the data pertaining to a graphical object comprises a bitmap describing the graphical object, wherein the representation of the graphical object is in the form of a temporary bitmap, wherein the step of computing a difference value comprises:

comparing each bit in the temporary bitmap with a corresponding bit in the received bitmap describing the graphical object, counting a number of differences between the bits in the temporary bitmap and the corresponding bit in the received bitmap describing the graphical object that exceeds a threshold difference, and use a resulting number of differences that exceed the threshold difference as the difference value.

The threshold difference could for example be realised as a luminance value between 0 and 255, such as 55. In an image frame where a two colour, black and white, matrix barcode object has been added this could mean that in this embodiment, it is checked whether the pixels of the matrix barcode in the temporary bitmap are within the ranges 0-55 or 200-255 corresponding to a black or white pixel respectively.

Consequently, a low complexity method of verifying non distortive compression is established.

According to some embodiments, the method further comprises receiving, by the image data generator, a size of a CU from the encoder.

Consequently, the CU size may be used to produce the first DFT set and the alignment of the first and second DFT sets may be ensured.

According to some embodiments, the method further comprises setting, by the image data generator, a size of a CU at the encoder.

Consequently, the CU size may be modified before producing the first DFT set and alignment of the first and second DFT sets may be ensured.

According to some embodiments, the graphical object comprises one from the list of:

a matrix barcode, a bounding box, a privacy mask, a border line.

The term "matrix barcode", generally refers to 2D, block based, black and white image, graphical objects where the individual blocks may represent a specific string of characters or a code. A common type of matrix barcode is the QR code. QR stands for "quick reaction" referring to the action of accessing the string or code quickly through digital image capture. It is also possible that the graphical object could be realised by a standard 1D barcode with a set of black and white lines.

The term "bounding box" generally refers to the edge outline of a geometric object added as an overlay to highlight some feature in the first image frame. The term "privacy mask" generally refers to an overlay object to render certain features in the first image frame not visible. The term "border line" may refer to any line used as an overlay to segment or emphasise objects or similar in the first image frame.

According to some embodiments, the DFT is a Discrete Cosine Transform, DCT, or a Discrete Sine Transform, DST.

Consequently, higher levels of compression can be reached without sacrificing to much of the original image quality due to the higher degree of spectral compaction of the DCT and DST methods.

According to a second aspect of the invention there is provided, a computer program product comprising a computer-readable storage medium with instructions adapted to carry out any of the mentioned methods, when executed by a device having processing capability.

Consequently, the inventive concept may be realized without requiring application specific encoding hardware on an array of different devices and platforms that can already today support video encoding.

According to a third aspect of the invention there is provided a system for adding a graphical object to image data of one or more image frames comprising a first image frame, the system comprising the encoder and an image data generator, wherein the image data generator is configured to:
receive data pertaining to the graphical object to be added to the image data of the one or more image frames
convert the graphical object into a first set of discrete frequency transform, DFT, blocks, based on a defined size of a coding unit, CU, of the encoder, each DFT block being associated with a position in the one or more image frames to which the DFT block corresponds;

wherein the encoder is configured to:
perform DFT on a plurality of block of pixels of the first image frame, to output a second set of DFT blocks;

wherein the image data generator is further configured to:
instruct the encoder to replace a subset of DFT blocks of the second set of DFT blocks with the first set of DFT blocks according to the positions associated with the first set of DFT blocks.

Consequently, the inventive concept may be realized with application specific equipment or encoding hardware.

The second and third aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The methods, software and systems disclosed herein will be described during operation.

Figure 1:
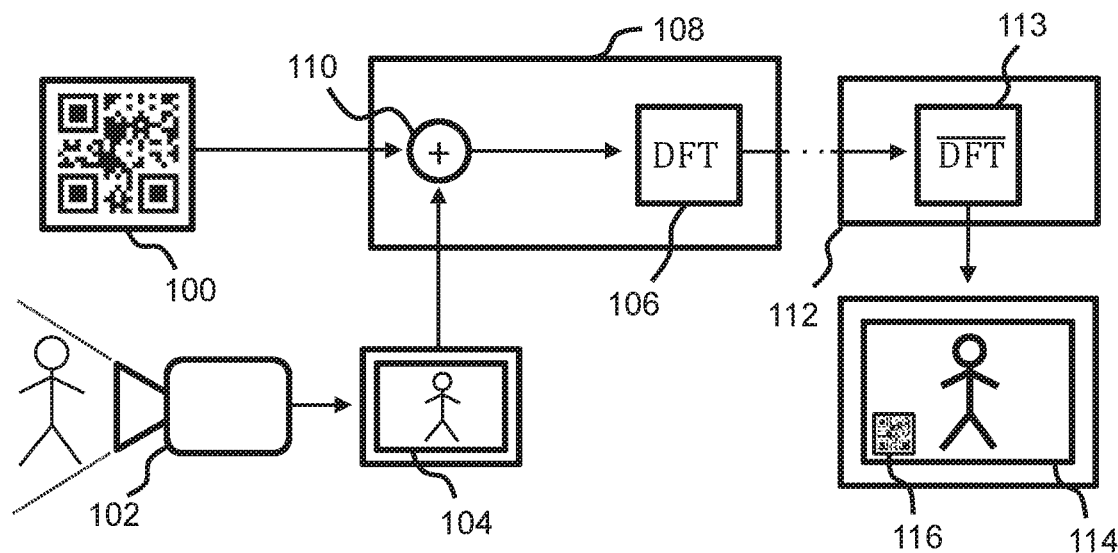
FIG. 1 shows a schematic representation of a prior art system with its limitations regarding faithfully representing the graphical object.
Figure 2:
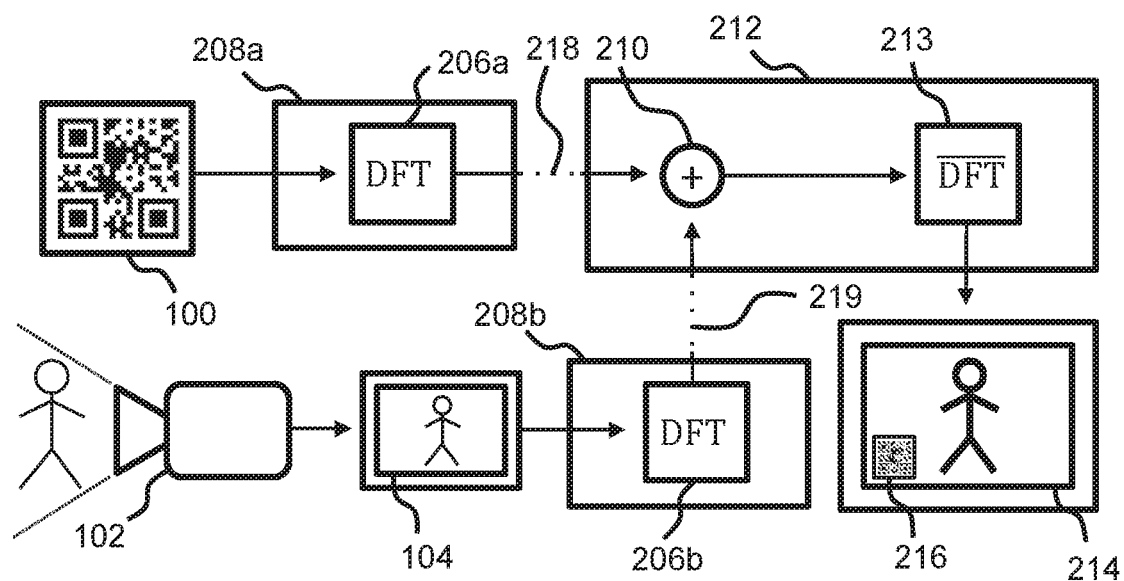
FIG. 2 shows a schematic representation of a prior art system wherein a separately encoded, fully rendered overlay is used.

As described above, it is today common to add graphical features into a video stream. Depending on the purpose of the added features this may be difficult using only the prior art as shown in FIGS. 1 and 2. In these examples a graphical object 100 is to be added onto a first image frame 104, captured by a camera 102. One option, shown in FIG. 1, is to combine 110 the graphical object 100 and the first image frame 104 in an encoder 108 before converting the combined image into a set of discrete frequency transform (DFT) blocks 106 through DFT conversion. In other words, the features of the graphical objects are added directly to the pixels of the first image 104, before DFT conversion. When the image is then recreated by inverse DFT conversion 113 in a decoder 112 the colours and features of a decoded graphical object 116 may have been compressed and distorted together with a decoded first image frame 114 resulting in e.g. smoothing of high contrast colour transitions and overall reduced image quality. This in turn, may lead to that the decoded graphical object 116 loses its carried information or becomes entirely unrecognisable.

A second option, shown in FIG. 2, is to use a first and a second encoder 208a-208b in which separate sets of DFT blocks 206a-206b are created through DFT conversion. The separate sets of DFT blocks 206a, 206b are sent as two different streams 218, 219 to a decoder 212. The blocks may then be combined 210 in the decoder 212 and inverse DFT converted 213 so that a decoded graphical object 216 may retain its information even if a decoded first image frame 214 has been compressed and distorted. This approach where the graphical object is added as a fully rendered overlay to the first image does come with a substantially larger bit rate cost.

To mitigate at least some of the problems of the prior art, the inventors have developed the present invention. Embodiments will now be described below.

Figure 3:
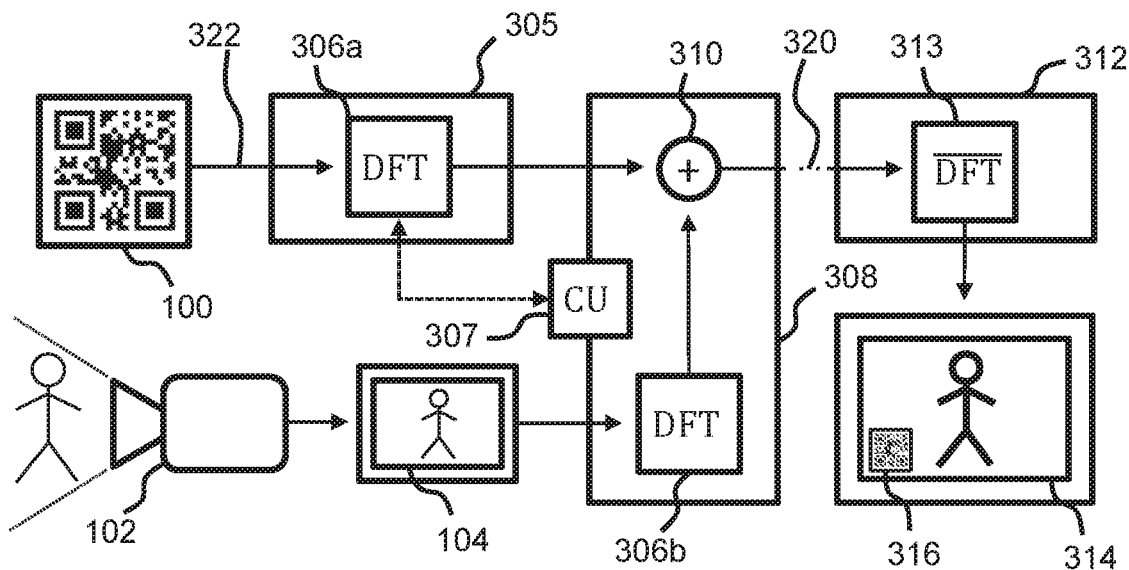
FIG. 3 shows a schematic representation of the present invention addressing the problems in the prior art.
Figure 5:
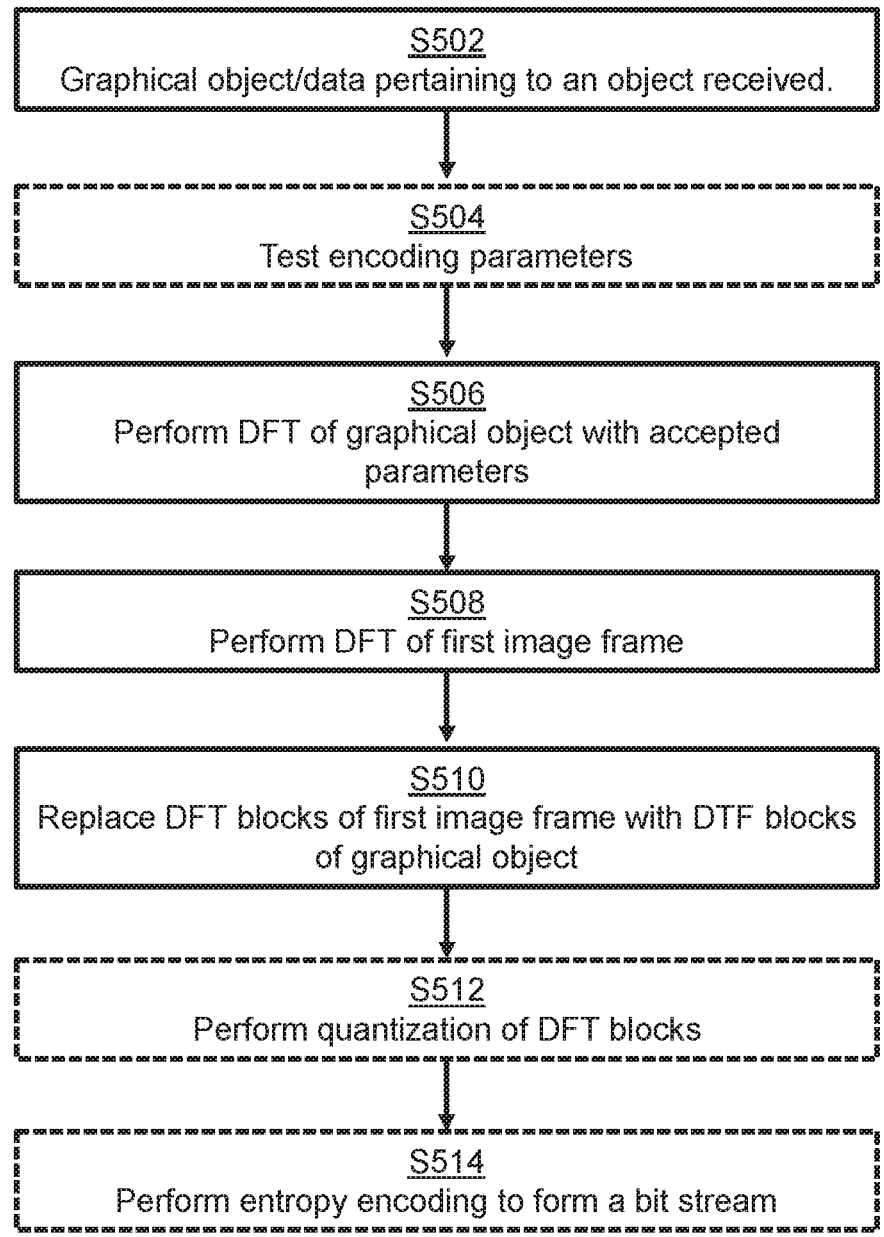
FIG. 5 shows a flow chart of a method for adding a graphical object to image data of one or more image frames comprising a first image frame according to embodiments.

FIG. 3 shows a system for adding a graphical object to image data of one or more image frames comprising a first image frame which will be described in conjunction with the flow chart in FIG. 5.

In this embodiment, an image content of a graphical object 100 is added during encoding of one or more image frames, including a first image frame 104, using an encoder 308.

An image data generator 305 is receiving S502 data 322 pertaining to a graphical object 100 to be added to the image data of the one or more image frames.

Various ways to describe the graphical object 100 during the input stage S502 of the process exists. According to some embodiments the data 322 pertaining to a graphical object 100 comprises a bitmap describing the graphical object 100. A bitmap corresponds to an image or array with values for each pixel in the image or cell in the array. For example, the values may be 0 or 1, describing white or black pixels, or transparent and not transparent pixels. In other embodiments, the values may for example range between 0-15, or 0-255 or any other suitable range of values, each value corresponding to a specific colour. Such a bitmap is often referred to as a pixmap.

According to further embodiments, the data 322 pertaining to a graphical object 100 comprises coordinates defining a position in the image data of the one or more image frames where the graphical object 100 should be added.

Hereby, a smaller representation of the graphical object 100, which could for example be a bitmap, may be used in conjunction with these coordinates to position it into the larger first image frame 104. Consequently, a more bit rate efficient description for large image frames may be achieved compared to receiving bitmaps representing the graphical object which has the size of the first image frame.

According to other embodiments, the data 322 pertaining to a graphical object 100 defines a polygon describing the graphical object 100. By way of example, such data may comprise the coordinates (0, 0), (0, 15), (15, 15), (15, 0), describing a square being 15×15 pixels in size. Such a polygon may also be combined with coordinates to place it into the larger image frame, as mentioned above, to e.g. position the square 100 pixels into the first image frame 104 when decoded again.

According further embodiments, the data 322 pertaining to a graphical object 100 may further comprise data defining a colour of the graphical object 100. For example, if the bitmap has values which are 0 and 1, where 0 represent a transparent pixel, and 1 is a non-transparent pixel, the data defining the colour of the graphical object 100 may inform the encoder 308 what colour the non-transparent pixels should have.

Figure 4:
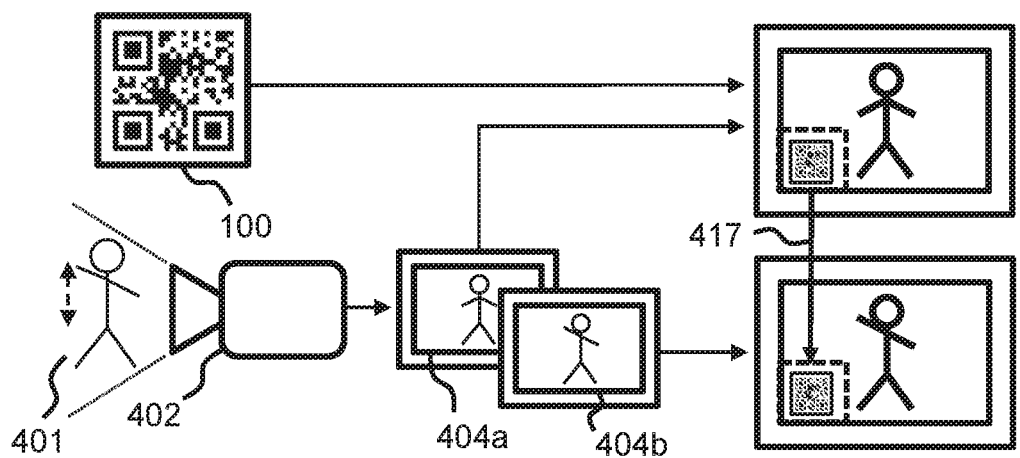
FIG. 4 shows a schematically shows inter encoding of image frames according to embodiments.

The graphical object 100 may be static or dynamic, meaning that it may stay the same over a plurality of image frames, or that it may be updated or modified between frames of a video sequence. In this context, the graphical object 100 may comprise for example bounding boxes, privacy masks, border lines and matrix barcodes. These could function to highlight or hide something in the frame or simply carry information in some form. The graphical object 100 in the FIGS. 3-4 is shown as being a matrix barcode but it could just as well be any other type of 2D-graphical object.

After receiving data 322 pertaining to the graphical object 100, the image data generator 305 converts the graphical object 100 into a first set of discrete frequency transform, DFT, blocks 306a.

Various DFT variants may be used such as discrete cosine transform (DCT), discrete sine transform (DST), discrete Fourier transform as well as custom frequency transforms (supported by some encoders/decoders) not included here. The DFT transform being used may be preconfigured in the image data generator 305, or it may be set during encoding in an iterative test regime S504 as will be further described in conjunction with FIG. 6 below. A DFT may feature various parameters and coefficients that affect how the DFT converts between the spatial colour and frequency domain.

The conversion S506 to the first set of DFT blocks 306a is made by the image data generator 305 and may be based on receiving a defined size of a coding unit, CU 307, from the encoder 308. The size of the coding unit, 307 at the encoder 308 may further be set by the image data generator 305. This allows for alignment of the first set of DFT blocks 306a and a second set of DFT blocks 306b representing the first image frame 104, among the plurality of image frames.

The second set of DFT blocks 306b is obtained by having the encoder 308 receive the plurality of image frames (including the first image frame 104) and perform DFT to convert S508 the first image frame to form a second set of DFT blocks 306b. DFT of the first image frame 104 is performed similarly to that which is described above regarding the graphical object 100, but it should be noted that this DFT used does not need to be the same and can be performed with different parameters. Each DFT block in the first set 306a is associated with a position in the one or more image frames to which the DFT block corresponds. The position is extracted or otherwise determined using the data 322 pertaining to the graphical object 100. For example coordinates defining a position of the graphical object may be used, and/or polygon data/bitmap data, etc.

The encoder 308 receiving the plurality of image frames and the image data generator 306 may be either a device, circuit, software program, or algorithm that can perform the required conversion of information. According to some embodiments of the invention there is provided, a computer program product comprising a computer-readable storage medium with instructions adapted to carry out any of the mentioned methods, when executed by a device having processing capability. The computer program product may be based on today available standard software encoder products and adapted for the present invention.

Some embodiments may comprise application specific hardware encoders and equipment adapted to performing the present invention. It is to be understood that in some contexts an actual physical encoder 308 may include the image data generator 305 as a process step or as a separate physical component with some sort of communicative connection to the rest of the encoder. In other words, the encoder 308 and the image data generator 305 may be implemented on a same device (using one or more processors) or in separate devices, wirelessly or wired connected.

The encoder 308 may additionally be connected to a video capturing device 102 which continuously captures image frames 104 depicting a scene. The encoder 308 may in some embodiments be implemented in direct conjunction to a video capturing device, and in other embodiments, the encoder 308 is separate from the video capturing device 102 and wired or wireless connected to the video capturing device 102.

The image data generator 305, further instructs the encoder 308 to replace S510 a subset of DFT blocks of the second set of DFT blocks 306b with the first set of DFT blocks 306a according to the positions associated with the first set of DFT blocks 306a. The sets of DFT blocks may be combined 310 in the encoder 308 by adding one of the sets of blocks onto the other or by replacing a subset of blocks with corresponding blocks of the other set.

The encoder may in some embodiments perform quantization S512 of the second set of DFT blocks 306b to form a set of quantized DFT blocks, wherein the quantization is performed using a map of quantization parameters which defines a quantization parameter for each DFT block of the second set of DFT blocks 306b. The encoder 308 may in some embodiments also perform entropy encoding S514 of the set of quantized DFT blocks to form the bit stream 320 by using methods such as, but not limited to, Huffman coding, CAVLC, or CABAC.

The encoder 308 thus converts the combined image data to a bit stream 320. The bit stream 320 contain for example image content of a video sequence and data instructions to be used in a decoding process. The bit stream 320 can be transmitted for example via direct electric connections, wireless or fibre optics. Reducing the bit rate and therefore also the bit stream load on the transmitting system allows the connection to sustain faster information transfer.

A decoder 312 may now perform decoding, during which an inverse DFT conversion 313, is utilised to output a combined image where the decoded graphical object 316 retains its information even if the first frame 314 is significantly compressed to reduce its overall impact on the bit rate. The inverse DFT conversion 313 is related to its corresponding DFT on the decoder side. Data about and parameters relating to the DFT may be received by the decoder 312 in order to facilitate the inverse DFT conversion 313 and decoding.

According to some embodiments, as manifested by FIG. 3 in combination with FIG. 4, a camera 402 is capturing a scene 401 that may contain moving elements. A first image frame 404a may in this case be intra frame encoded by the encoder 308, wherein the one or more image frames comprises a second frame 404b being a subsequent to the first image frame 404a. The second image frame 404b is inter frame encoded and referencing the first image frame 404a. The image data generator 305 then instructs the encoder 308 to inter encode blocks of pixels in the second image frame 404b corresponding 417 to the positions associated with the first set of DFT blocks 306a in the first image frame 404a, and to set motion vectors of said blocks of pixels in the second image frame 404b to zero.

In situations where the graphical object is static this allows for the reuse of the first set of DFT blocks 306a over several image frames, saving processing resources. Advantageously, the graphical object may be non-transparent, even if graphical objects with transparent areas also may benefit from the embodiment of FIG. 4. In this case, image content in the transparent areas will not change between image frames, which may be acceptable for example if the transparent areas are only small, or if the graphical object is positioned in a less interesting area of the plurality of image frames.

As motion vectors are set to zero for the block of pixels associated with an added graphical object, this area is spared from the prediction related distortion they may otherwise be subjected to because of the inter frame encoding of the scene 401, containing moving elements in close proximity to the added graphical object. Moreover, computational resources are saved, since block matching (motion prediction) is not needed for the area corresponding to the static graphical object in the image frame(s) 404b following the intra encoded image frame.

Furthermore, the one or more image frames may represent a group of pictures, GOP, wherein the above mentioned method is repeated for all image frames subsequent to the first image frame 404a in the GOP.

It should be noted that for dynamic graphical objects, regular inter encoding of the blocks of pixels in the second image frame 404b corresponding 417 to the graphical object in the second image frame is advantageously employed. For example, for a changing QR code, many similarities between the graphical object inserted in the first image frame and the graphical object inserted in the second image frame may be found, resulting in an efficient inter encoding even if a dynamic graphical object is inserted in the plurality of image frames.

It should further be noted that according some encoding standards such as AV1, motion prediction within a same frame is possible, even for intra encoding. This means that for a block of pixels of the graphical object inserted in the first image frame, motion prediction to an already encoded block of pixels of the graphical object in the first image frame may be employed, resulting in that the block of pixels is encoded with a motion vector and residual data. For repetitive graphical objects such as a QR code, this may advantageously be implemented, further increasing the coding efficiency of the present invention.

Figure 6:
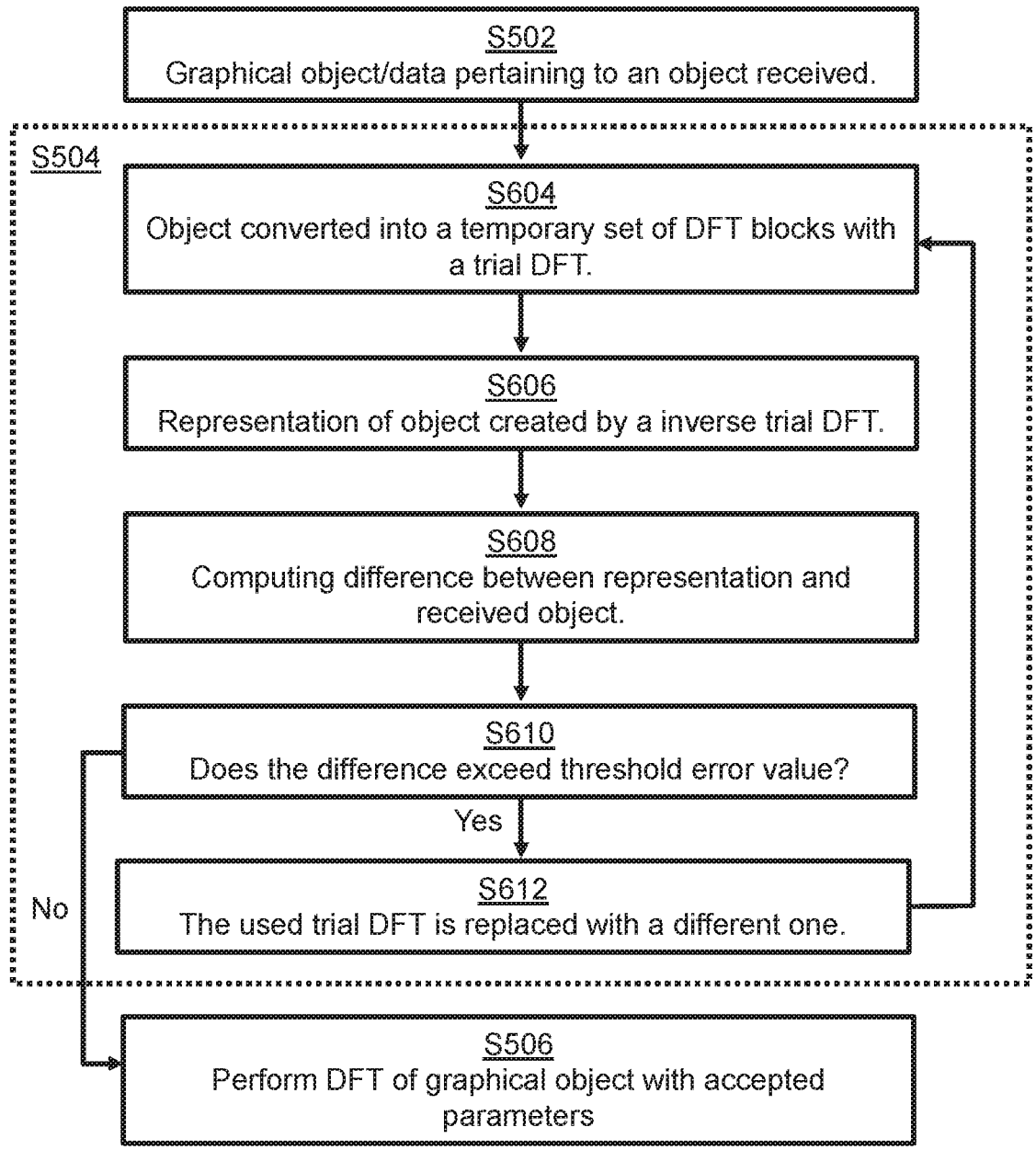
FIG. 6 shows a flow chart over the method wherein a frequency transform to be used for the graphical object is iteratively established.

FIG. 6 shows a flow chart illustrating how some embodiments of the invention related specifically to the iterative test regime S504 which serves to establish usable encoding parameters and ensure acceptable compression of the added graphical objects.

The iterative test regime S504 involves the image data generator 305 and may be initiated by it receiving S502 the graphical object 100 or data 322 pertaining to said graphical object. The graphical object 100 is then converted S604 into a temporary first set of discrete frequency transform, DFT, blocks, using a trial frequency transform. The temporary first set of DFT blocks is then converted back S606 to a representation of the graphical object using an inverse of the trial frequency transform. A difference value between the representation of the graphical object and the received graphical object is then computed S608. Upon determining S610 that the difference value exceeds a threshold error value, iteration of the steps S604-S608 is performed using a different trial frequency transform. When the iteration results in a difference value that does not exceed the threshold error value, the trial frequency transform resulting in said difference value is used for converting S506 the graphical object 100 into the first set of DFT blocks 306a.

The trial frequency transform parameters may for example be chosen from a predefined list or selected by a random selection process. Used parameters and parameters effectively close to ones already used may be excluded from further testing in the event that the trial frequency transform is not accepted. Data on previously accepted frequency transforms may be saved in order to reduce the required number of iterations while encoding subsequent graphical objects that may feature similar characteristics to the object, for which the accepted frequency transform was previously found. Using the embodiment of FIG. 6, a certain target quality of the later decoded graphical object may be ensured.

According to a further development of this embodiment a quantization test is introduced. After converting S604 the graphical object into a temporary first set of DFT blocks, using a trial frequency transform, quantization of the temporary first set of DFT blocks is performed using a trial quantization parameter to form a temporary set of quantized DFT blocks. Inverse quantization of the temporary set of quantized DFT blocks is then performed to form a temporary second set of DFT blocks. These blocks are then converted back to a representation of the graphical object using an inverse of the trial frequency transform and a difference value is computed as mentioned above. If the difference value exceeds the threshold error value the iteration may now try either a different trial frequency transform or a different trial quantization parameter or both. Once the iteration results in the difference value not exceeding the threshold error value, the current trial frequency transform is used to convert the graphical object 100 into the first set of discrete frequency transform, DFT, blocks 306a. This step is followed by the encoder, performing quantization of the DFT blocks of the second set of DFT blocks corresponding to the graphical object blocks to form a set of quantized DFT blocks using the trial quantization parameter resulting in the difference value which does not exceed the threshold error value. In other words, a map of quantization parameters which defines a quantization parameter for each DFT block of the second set of DFT blocks is updated according to the trial quantization parameter for the DFT blocks corresponding to the graphical object.

According to a further embodiment of the iterative test regime S504 the data pertaining to a graphical object may comprise a bitmap describing the graphical object. The representation of the graphical object may be in the form of a temporary bitmap, wherein the step of computing a difference value includes comparing each bit in the temporary bitmap with a corresponding bit in the received bitmap describing the graphical object. A number of differences between the bits in the temporary bitmap and the corresponding bit in the received bitmap describing the graphical object that exceeds a threshold difference is computed. The resulting number of differences that exceed the threshold difference is then used as the difference value.

For the above mentioned feedback testing steps, the threshold difference could for example be realised as a luminance value between 0 and 255. In an image frame where a two colour, black and white, matrix barcode object has been added this could mean that the iterative test regime S504 checks whether the pixels of the matrix barcode in the back converted S606 representation are within the ranges 0-55 or 200-255 corresponding to a black or white pixel respectively. Consequently, the threshold difference is 55 in this case. If the initial pixel values align with the representation (i.e. the difference is less than e.g. 55, and the resulting number of differences that exceed this threshold difference is less than the threshold error value, for example 10, 50 or any other suitable number depending on the implementation), the trial frequency transform and/or trial quantization parameter are determined to be acceptable. Note that this is just one example of the threshold error value which could just as well refer to a total error percentage of number of pixels not falling into the set ranges, or number of points in a polygon representation of the graphical object that have been offset in the representation of the graphical object, etc. In embodiments where the graphical object represents a QR code or similar, the computing a difference value between the representation of the graphical object and the received graphical object may comprise trying to read the information embedded in the QR code (e.g. a web address) and compare it to the information embedded in the QR code received by the image data generator. In case the decoded information differs with the intended information, the difference value may be considered to exceed the threshold difference value.

In summary, the present invention relates to a method for adding a graphical object to image data of one or more image frames comprising a first image frame, the graphical object being added during encoding of the one or more image frames using an encoder, wherein the image data generator is converting the graphical object into a first set of discrete frequency transform, DFT, blocks each DFT block being associated with a position in the one or more image frames to which the DFT block corresponds. The encoder is performing DFT on a plurality of block of pixels of the first image frame, to output a second set of DFT blocks and then replacing a subset of DFT blocks of the second set of DFT blocks with the first set of DFT blocks according to the positions associated with the first set of DFT blocks.

For example, the disclosure may advantageously be implemented when adding information to a live stream of video. The information may for example correspond to one or more matrix barcodes overlaid in the live stream, and conveying information about content of the live stream. Such information may for example comprise specifics about houses, venues, streets, monuments, sights etc., captured by the live stream, which information may be read by a viewer of the live stream using e.g. a smartphone decoding the matrix barcode. In other embodiments, the live stream is overlaid with information helping an operator for monitoring purposes, such as bounding boxes, etc.

Additionally, variations to the disclosed embodiments can be understood and effected by the skilled person in practicing the claimed invention, from a study of the drawings, the disclosure, and the appended claims.

The invention claimed is:

1. A method for adding a graphical object to image data of one or more image frames comprising a first image frame, the graphical object being added during encoding of the one or more image frames using an encoder, wherein the first image frame is intra frame encoded by the encoder, wherein the one or more image frames comprises a second frame being a subsequent to the first image frame, the second image frame being inter frame encoded and referencing the first image frame, the method comprising the steps of:
  receiving, by an image data generator, data pertaining to the graphical object to be added to the image data of the one or more image frames;
  converting, by the image data generator, the graphical object into a first set of discrete frequency transform, DFT, blocks, based on a defined size of a coding unit, CU, of the encoder, each DFT block being associated with a position in the one or more image frames to which the DFT block corresponds;
  performing, by the encoder, DFT on a plurality of block of pixels of the first image frame, to output a second set of DFT blocks;
  instructing, by the image data generator, the encoder to replace a subset of DFT blocks of the second set of DFT blocks with the first set of DFT blocks according to the positions associated with the first set of DFT blocks; and
  instructing, by the image data generator, the encoder to inter encode blocks of pixels in the second image frame corresponding to the positions associated with the first set of DFT blocks, and to set motion vectors of said blocks of pixels in the second image frame to zero.

2. A method according to claim 1, wherein the one or more image frames represent a group of pictures, GOP, wherein the method is repeated for all image frames subsequent to the first image frame in the GOP.

3. A method according to claim 1, wherein the data pertaining to a graphical object comprises a bitmap describing the graphical object.

4. A method according to claim 3, wherein the data pertaining to a graphical object further comprises coordinates defining a position in the image data of the one or more image frames where the graphical object should be added.

5. A method according to claim 1, wherein the data pertaining to a graphical object defines a polygon describing the graphical object.

6. A method according to claim 3, wherein the data pertaining to a graphical object further comprises data defining a colour of the graphical object.

7. A method according to claim 1, further comprising, after the step of instructing, by the image data generator, the encoder to replace a subset of DFT blocks of the second set of DFT blocks with the first set of DFT blocks according to the positions associated with the first set of DFT blocks, the step of:
  performing, by the encoder, quantization of the second set of DFT blocks to form a set of quantized DFT blocks, wherein the quantization is performed using a map of quantization parameters which defines a quantization parameter for each DFT block of the second set of DFT blocks,
  performing, by the encoder, entropy encoding of the set of quantized DFT blocks to form a bit stream.

8. A method according to claim 1, wherein the step of converting, by the image data generator, the graphical object into a first set of DFT blocks comprises:
  a) converting the graphical object into a temporary first set of discrete frequency transform, DFT, blocks, using a trial frequency transform,
  b) converting the temporary first set of DFT blocks back to a representation of the graphical object using an inverse of the trial frequency transform,
  c) computing a difference value between the representation of the graphical object and the received graphical object,
  upon determining that the difference value exceeds a threshold error value, iteratively performing steps a)-c) using a different trial frequency transform until the difference value does not exceed the threshold error value, and using the trial frequency transform resulting in the difference value which does not exceed the threshold error value for converting the graphical object into the first set of discrete frequency transform, DFT, blocks.

9. A method according to claim 7, wherein the step of converting, by the image data generator, the graphical object into a first set of DFT blocks comprises:
  a) converting the graphical object into a temporary first set of DFT blocks, using a trial frequency transform;
  b) performing quantization of the temporary first set of DFT blocks to form using a trial quantization parameter to form a temporary set of quantized DFT blocks;
  c) performing inverse quantization of the temporary set of quantized DFT blocks to form a temporary second set of DFT blocks,
  d) converting the temporary second set of DFT blocks back to a representation of the graphical object using an inverse of the trial frequency transform,
  e) computing a difference value between the representation of the graphical object and the received graphical object,
  upon determining that the difference value exceeds a threshold error value, iteratively performing steps a)-e) using a different trial frequency transform or a different trial quantization parameter until the difference value does not exceed the threshold error value, and using the trial frequency transform resulting in the difference value which does not exceed the threshold error value for converting the graphical object into the first set of discrete frequency transform, DFT, blocks, wherein the step of performing, by the encoder, quantization of the second set of DFT blocks to form a set of quantized DFT blocks comprises using the trial quantization parameter resulting in the difference value which does not exceed the threshold error value as the quantization parameter for the DFT blocks of the second set of DFT blocks corresponding to the graphical object.

10. A method according to claim 8, wherein the data pertaining to a graphical object comprises a bitmap describing the graphical object, wherein the representation of the graphical object is in the form of a temporary bitmap, wherein the step of computing a difference value comprises:

comparing each bit in the temporary bitmap with a corresponding bit in the received bitmap describing the graphical object, counting a number of differences between the bits in the temporary bitmap and the corresponding bit in the received bitmap describing the graphical object that exceeds a threshold difference, and use a resulting number of differences that exceed the threshold difference as the difference value.

11. A method according to claim 1, further comprises receiving, by the image data generator, a size of a CU from the encoder.

12. A method according to claim 1, further comprises setting, by the image data generator, a size of a CU at the encoder.

13. A non-transitory computer-readable storage medium storing thereon computer executable instructions which when executed by a processor, cause the processor to perform the method of claim 1.

14. A system for adding a graphical object to image data of one or more image frames comprising a first image frame, the system comprising the encoder and an image data generator, wherein the first image frame is intra frame encoded by the encoder, wherein the one or more image frames comprises a second frame being a subsequent to the first image frame, the second image frame being inter frame encoded and referencing the first image frame, wherein the image data generator is configured to:

receive data pertaining to the graphical object to be added to the image data of the one or more image frames;

convert the graphical object into a first set of discrete frequency transform, DFT, blocks, based on a defined size of a coding unit, CU, of the encoder, each DFT block being associated with a position in the one or more image frames to which the DFT block corresponds;

wherein the encoder is configured to:

perform DFT on a plurality of block of pixels of the first image frame, to output a second set of DFT blocks;

wherein the image data generator is further configured to:

instruct the encoder to replace a subset of DFT blocks of the second set of DFT blocks with the first set of DFT blocks according to the positions associated with the first set of DFT blocks; and instruct the encoder to inter encode blocks of pixels in the second image frame corresponding to the positions associated with the first set of DFT blocks, and to set motion vectors of said blocks of pixels in the second image frame to zero.

* * * * *